J. H. RAWLINS.
RESILIENT TIRE FOR VEHICLE WHEELS.
APPLICATION FILED JAN. 21, 1909.
949,684.
Patented Feb. 15, 1910.
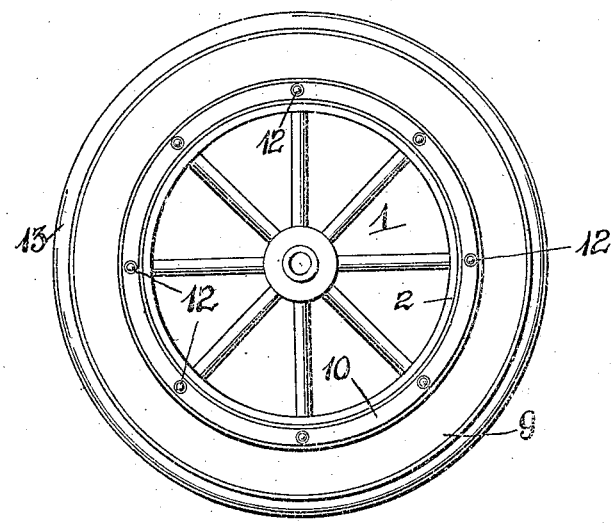
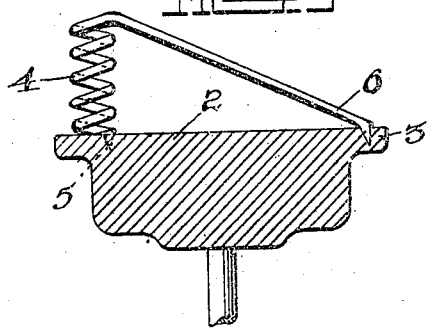
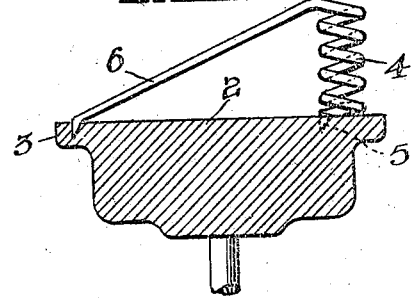
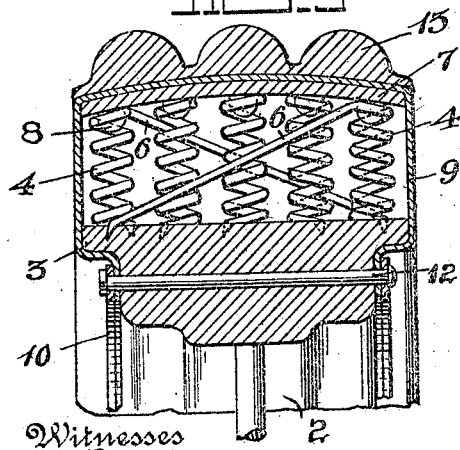
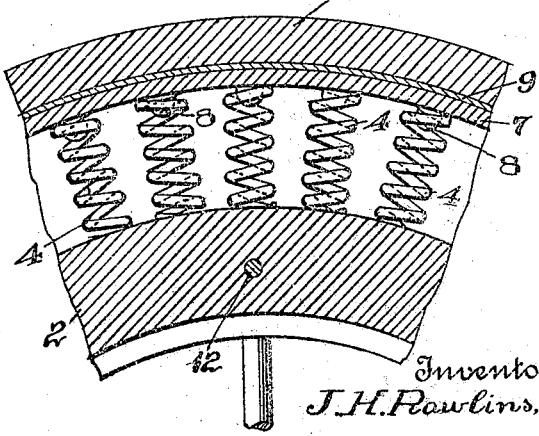
Witnesses
E. Crocker
C. H. Greesbauer
Inventor
J. H. Rawlins,
By H. B. Willson & Co
Attorneys

UNITED STATES PATENT OFFICE.

JOHN H. RAWLINS, OF UPLAND, PENNSYLVANIA.

RESILIENT TIRE FOR VEHICLE-WHEELS.

949,684.  Specification of Letters Patent.  Patented Feb. 15, 1910.

Application filed January 21, 1909. Serial No. 473,494.

*To all whom it may concern:*

Be it known that I, JOHN H. RAWLINS, a citizen of the United States, residing at Upland, in the county of Delaware and State of Pennsylvania, have invented certain new and useful Improvements in Resilient Tires for Vehicle-Wheels; and I do declare the following to be a full, clear, and exact description of the invention, such as will enable others skilled in the art to which it appertains to make and use the same.

This invention relates to improvements in resilient tires for vehicle wheels.

The object of the invention is to provide a tire of this character having arranged therein a series of springs and means for holding said springs in position whereby all the advantages of a pneumatic tire will be obtained without the annoyance and danger which result from the puncturing or bursting of pneumatic tires.

With this and other objects in view, the invention consists of certain novel features of construction, combination and arrangement of parts as will be more fully described and particularly pointed out in the appended claims.

In the accompanying drawings, Figure 1 is a side view of the wheel showing the application of the invention thereto; Fig. 2 is a longitudinal sectional view of a portion of the rim and tire of the wheel; Fig. 3 is a cross sectional view through the rim and tire; Fig. 4 is a detail cross sectional view of the rim showing one of the springs of the outside row or series of springs and illustrating the manner in which these springs are tied at their upper ends to prevent lateral movement of the tire; Fig. 5 is a similar view showing the manner of tying the springs in the outside row at the opposite side of the rim.

Referring more particularly to the drawings, 1 denotes a wheel and 2 denotes the rim which is preferably formed of wood and which may be of any suitable shape and provided with suitable outer surface, said surface being shown in the present instance as being flat. The rim is provided adjacent to its outer surface with laterally projecting annular flanges 3, the purpose of which will be hereinafter described.

Arranged around the outer surface of the rim are series of coiled springs 4, said springs being preferably arranged in parallel annular rows. Each of the springs is secured at its lower end to the outer surface of the rim by suitable fastening devices 5. Each of the springs of the outer rows are secured or tied, at their upper ends, to the opposite side of the surface of the rim by brace or tie wires 6 which are preferably an extension of the upper end of the spring and which form means for bracing the upper ends of the springs of the outer rows and for holding the tire against lateral movement. This manner of tying or bracing the outer rows of springs is clearly illustrated in Figs. 4 and 5 of the drawings.

Arranged around the outer ends of the springs is a retaining strip 7 which is in the form of a flat band constructed of leather, canvas or other suitable material having the required stiffness and strength to hold the springs in shape. The upper ends of the springs are held in proper position against the under side of the retaining strip 7 by means of studs 8 which are secured to the under side of the strip or band 7 as shown.

Arranged over the springs and retaining strip 7 is a tire 9 which may be formed of any suitable water proof fabric having the required strength. The inner edges of the tire 9 are secured to the side of the rim below the flanges 3 by means of annular clamping rings 10, said rings being bolted in position by transversely disposed bolts 12 which are inserted through the rim and through the rings 10, as shown.

On the tread surface of the tire is arranged a shoe 13 which may be of any suitable construction and is here shown as being in the form of a series of annular corrugations or ribs.

A tire constructed as herein shown and described will be comparatively inexpensive in construction, efficient and reliable in operation and well adapted for the purposes for which it is designed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. A resilient tire for vehicle wheels comprising a rim, a series of coiled springs arranged in parallel annular rows and secured at their lower ends to the rim, tie or brace rods to connect the upper ends of the springs of the outer rows to the opposite sides of the rim whereby the tire is held against lateral movement, a flexible retaining strip arranged around said springs, a flexible tire adapted to cover and inclose said springs and strip, and means to secure the inner edges of the tire to the side of the rim.

2. A resilient tire for vehicle wheels comprising a rim, a series of coiled springs secured at their lower ends to the rim the upper ends of the springs of the outer rows being extended to form braces, said braces being secured at their free ends to the opposite side of the surface of the rim and a flexible tire secured to the rim and adapted to cover and inclose said springs.

3. A resilient tire for vehicle wheels comprising a rim having laterally projecting annular flanges, a series of springs arranged around said rim and secured thereto at their lower ends, a retaining strip arranged around said springs, holding studs arranged on the inner side of said strip to engage the upper ends of the springs whereby they are held in position, a flexible tire arranged around and adapted to inclose said springs and strip, clamping rings adapted to secure the inner edges of the tire below the flanged edge of the rim, fastening bolts arranged through said rim and clamping rings, and a corrugated shoe arranged around the tread surface of the tire.

In testimony whereof I have hereunto set my hand in presence of two subscribing witnesses.

JOHN H. RAWLINS.

Witnesses:
CHAS. E. RODGERS,
N. W. GARVINE.